(12) United States Patent
Kim et al.

(10) Patent No.: US 9,674,093 B2
(45) Date of Patent: Jun. 6, 2017

(54) METHOD AND APPARATUS FOR RIPPLE RATE SENSITIVE AND BOTTLENECK AWARE RESOURCE ADAPTATION FOR REAL-TIME STREAMING WORKFLOWS

(71) Applicant: Xerox Corporation, Norwalk, CT (US)

(72) Inventors: Hyun Joo Kim, Monmouth Junction, NJ (US); Nathan Gnanasambandam, Victor, NY (US); Gueyoung Jung, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 389 days.

(21) Appl. No.: 14/462,044

(22) Filed: Aug. 18, 2014

(65) Prior Publication Data

US 2016/0050151 A1 Feb. 18, 2016

(51) Int. Cl.
| | |
|---|---|
| *G06F 15/16* | (2006.01) |
| *H04W 4/00* | (2009.01) |
| *G06F 9/46* | (2006.01) |
| *H04L 12/803* | (2013.01) |
| *H04L 29/06* | (2006.01) |
| *H04L 12/911* | (2013.01) |
| *H04L 12/853* | (2013.01) |

(52) U.S. Cl.
CPC .......... *H04L 47/122* (2013.01); *H04L 47/788* (2013.01); *H04L 47/823* (2013.01); *H04L 65/80* (2013.01); *H04L 47/2416* (2013.01)

(58) Field of Classification Search
CPC ... G06Q 10/10; H04L 29/06; H04L 29/08072; H04L 29/06027; H04L 12/581; G06F 9/52; G06F 9/4881; G06F 9/4843; G06F 8/45; H04W 84/12; H04W 84/18; H04W 80/04; H04W 8/26; H04W 88/06
USPC ........................................................ 709/204
See application file for complete search history.

(56) References Cited

U.S. PATENT DOCUMENTS

| | | | | |
|---|---|---|---|---|
| 2003/0016770 | A1* | 1/2003 | Trans ....................... | H04B 1/00 375/346 |
| 2004/0246933 | A1* | 12/2004 | Valko ...................... | H04L 29/06 370/338 |
| 2007/0005413 | A1* | 1/2007 | Hennings .......... | G06Q 10/06311 705/7.13 |
| 2007/0294562 | A1* | 12/2007 | Takamatsu .......... | G06F 11/2025 714/4.1 |
| 2008/0195808 | A1* | 8/2008 | Chi ....................... | G06F 3/0613 711/114 |
| 2009/0006366 | A1* | 1/2009 | Johnson ............ | G06F 17/30707 |

(Continued)

*Primary Examiner* — Mahran Abu Roumi (57) ABSTRACT

A method, non-transitory computer readable medium, and apparatus for adapting resources of the cluster of nodes for a real-time streaming workflow are disclosed. For example, the method receives a notification that a node of the cluster of nodes associated with an instance of a process of the real-time streaming workflow is predicted to be a bottleneck, identifies a number of hops to send a resource statement when the bottleneck is predicted that minimizes a ripple effect associated with transmitting the resource statement, transmits the resource statement to at least one or more nodes of the cluster of nodes within the number of hops, receives a response from one of the at least one or more nodes within the cluster of nodes and adapts a resource usage to the at least one of the one or more nodes within the cluster of nodes that the response was received from.

15 Claims, 3 Drawing Sheets

(56) References Cited

U.S. PATENT DOCUMENTS

| | | | |
|---|---|---|---|
| 2009/0216624 A1* | 8/2009 | Kato | G06F 11/3409 |
| | | | 705/7.38 |
| 2010/0250748 A1* | 9/2010 | Sivasubramanian | G06F 9/5016 |
| | | | 709/226 |
| 2012/0081382 A1* | 4/2012 | Lindahl | G06T 11/00 |
| | | | 345/581 |
| 2012/0131180 A1* | 5/2012 | Nomura | G06F 9/5077 |
| | | | 709/224 |
| 2012/0278388 A1* | 11/2012 | Kleinbart | G06Q 10/10 |
| | | | 709/204 |
| 2013/0030785 A1* | 1/2013 | Satterfield | G06Q 10/06 |
| | | | 703/21 |
| 2015/0092938 A1* | 4/2015 | Steiner | H04M 3/5233 |
| | | | 379/265.12 |
| 2015/0150020 A1* | 5/2015 | Duttagupta | G06F 9/466 |
| | | | 718/104 |
| 2015/0178129 A1* | 6/2015 | Dube | G06F 9/4881 |
| | | | 718/106 |
| 2015/0200807 A1* | 7/2015 | Edwards | H04L 41/0813 |
| | | | 709/220 |
| 2015/0304862 A1* | 10/2015 | Nagaraja | H04W 24/02 |
| | | | 455/418 |

\* cited by examiner

METHOD AND APPARATUS FOR RIPPLE RATE SENSITIVE AND BOTTLENECK AWARE RESOURCE ADAPTATION FOR REAL-TIME STREAMING WORKFLOWS

The present disclosure relates generally to managing resources in a cluster of nodes and, more particularly, to a method and apparatus for adapting resources of the cluster of nodes for a real-time streaming workflow.

BACKGROUND

In real-time streaming workflows, data sources continuously generate data and the data is processed. The workflow should satisfy quality of service (QoS) metrics, such as targeted throughput or a time constraint for completing each segment of the streaming data. However, surges in one or more stages of the workflow can create bottlenecks in the workflow.

Previous methods resolved the bottlenecks by blindly adding more resources to the entire workflow. However, loading changes may be dynamic in a real-time environment and simply adding more resources may be inefficient or in accurate.

For example, not all processes may have a linear relationship between the processing speed and the amount of resources that are needed to handle the additional surge in load. Thus, if the incoming data load doubles, then the needed resources may not be two times more than the currently available amount of resources to preserve the original processing speed. Rather, the workflow may require four times more than the amount of available resources to handle the doubling of the incoming data, and so forth.

SUMMARY

According to aspects illustrated herein, there are provided a method, a non-transitory computer readable medium, and an apparatus for adapting resources of the cluster of nodes for a real-time streaming workflow. One disclosed feature of the embodiments is a method that receives a notification that a node of the cluster of nodes associated with an instance of a process of the real-time streaming workflow is predicted to be a bottleneck, identifies a number of hops to send a resource statement when the bottleneck is predicted that minimizes a ripple effect associated with transmitting the resource statement, transmits the resource statement to one or more nodes of the cluster of nodes within the number of hops, receives a response from at least one of the one or more nodes within the cluster of nodes and adapts a resource usage to the at least one of the one or more nodes within the cluster of nodes that the response was received from.

Another disclosed feature of the embodiments is a non-transitory computer-readable medium having stored thereon a plurality of instructions, the plurality of instructions including instructions which, when executed by a processor, cause the processor to perform an operation that receives a notification that a node of the cluster of nodes associated with an instance of a process of the real-time streaming workflow is predicted to be a bottleneck, identifies a number of hops to send a resource statement when the bottleneck is predicted that minimizes a ripple effect associated with transmitting the resource statement, transmits the resource statement to one or more nodes of the cluster of nodes within the number of hops, receives a response from at least one of the one or more nodes within the cluster of nodes and adapts a resource usage to the at least one of the one or more nodes within the cluster of nodes that the response was received from.

Another disclosed feature of the embodiments is an apparatus comprising a processor and a computer readable medium storing a plurality of instructions which, when executed by the processor, cause the processor to perform an operation that receives a notification that a node of the cluster of nodes associated with an instance of a process of the real-time streaming workflow is predicted to be a bottleneck, identifies a number of hops to send a resource statement when the bottleneck is predicted that minimizes a ripple effect associated with transmitting the resource statement, transmits the resource statement to one or more nodes of the cluster of nodes within the number of hops, receives a response from at least one of the one or more nodes within the cluster of nodes and adapts a resource usage to the at least one of the one or more nodes within the cluster of nodes that the response was received from.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for adapting resources of the cluster of nodes for a real-time streaming workflow. As discussed above, real-time streaming workflows may continuously receive generated data that needs to be processed. However, one or more stages of the workflow can have a surge of data that can create bottlenecks in the workflow. One embodiment of the present disclosure provides an adaptation that can be more targeted to predicted bottlenecks rather than blindly adding more resources to the entire workflow after bottlenecks are detected.

Figure 1:
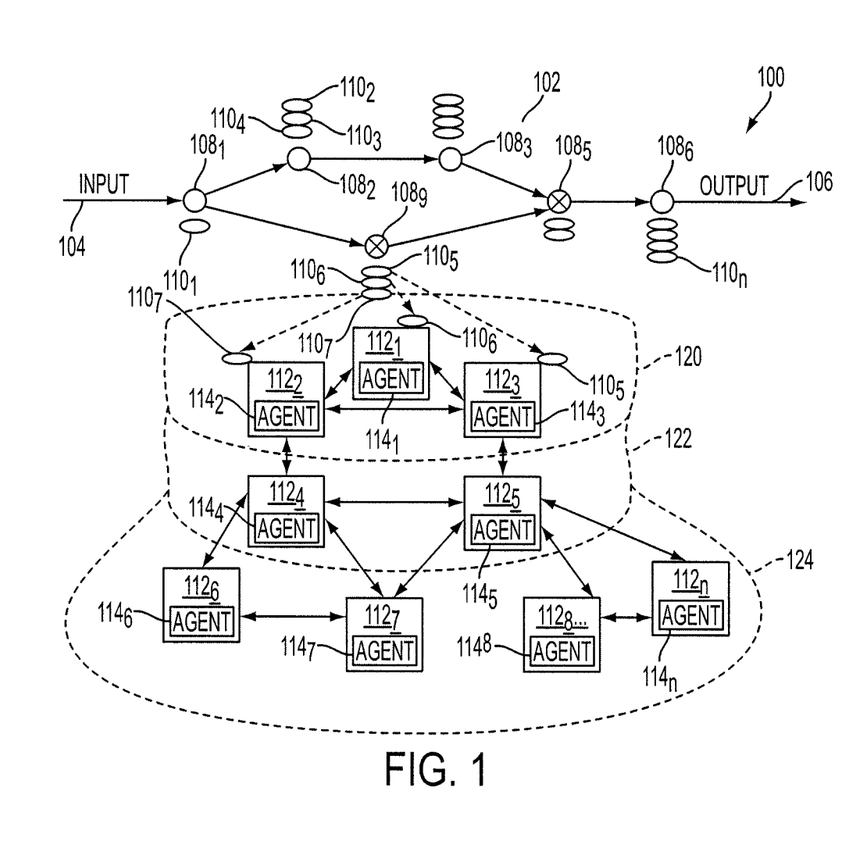
FIG. 1 illustrates an example network of the present disclosure.

FIG. 1 illustrates an example network 100 of the present disclosure. In one embodiment, the network 100 may include a cluster of nodes $112_1$ to $112_n$ (herein also referred to collectively as a cluster of nodes 112 or node(s) 112). In one embodiment, the cluster of nodes 112 may be part of a cloud computing environment. For example, the nodes 112 may be remotely located from one another or located at a same location. It should be noted that although only a single cluster of nodes 112 is illustrated in FIG. 1 that any number of cluster of nodes 112 may be deployed.

In one embodiment, each node 112 may comprise a server or a general purpose computer deployed in hardware, such as for example, the computer 300 illustrated in FIG. 3 and discussed below. In one embodiment, each node 112 may have a respective agent $114_1$ to $114_n$ (herein also referred to collectively as an agent or agents 114). In one embodiment, the agent 114 may be responsible for performing the functions and processes described herein via the hardware of the node 112.

In one embodiment, one or more of the nodes 112 may run one or more instances $110_1$ to $110_n$ (herein also referred to collectively as an instance 110 or instances 110) of one or more processes $108_1$ to $108_n$ (herein also referred to collectively as a process 108 or processes 108) of a workflow 102. The number of instances 110 of a single process 108 may be based on an amount of resources of a given cluster of nodes 112 of the process 108. If the cluster of nodes 112 has a large amount of resources, a single large instance 110 may be used for a single process 108. However, typically the instances may have to be deployed on different nodes 112 based on resource availability of the nodes 112. In one embodiment, the amount of resources may be include an amount of processing power, an amount of memory, an amount of network capability, and the like.

In one embodiment, the workflow 102 receives input data 104, processes the input data 104 via the one or more processors 108 and produces output data 106. In one embodiment, the input 104 may be real-time streaming data that is continuously fed to the workflow 102. Examples of real-time streaming data may include, for example, data from sensors, weather data, data from social networks, telephone call data, and the like.

In one embodiment, each process 108 of the workflow 102 receives the input data 104 from its preceding process 108, performs an analysis and sends out the output data 106 to the succeeding process 108. The data flowing through the workflow 102 varies in size and rate at each process 108 not only because each process 108 executes a different analysis and generates the output 106 at a different rate, but also it may be fused with data from other sources or summarize data (e.g., at the process $108_5$).

In one embodiment, each instance 110 of a process 108 may monitor an incoming data rate, an outgoing data rate and a processing rate. Each instance 110 may compare the three rates to check if they are balanced. The different types of detected imbalances may include, for example, the processing rate is smaller than the incoming data rate indicating that the input data 104 is not processed in time due to a lack of processing capability at the node 112 or the output data rate is smaller than the processing rate, which means the generated output is not delivered in time due to a lack of network bandwidth between the instance 110 and its succeeding instance 110.

If the instance 110 detects a bottleneck at its process 108, the instance 110 may report the bottleneck to an agent 114 of the node 112 that is assigned to the instance 110. When the agent 114 of the node 112 receives an indication that the process 108 will be a bottleneck, an adaptation may be performed by the agent 114 running on the node 112. In one embodiment, the adaptation may be a migration. For example, the instance 110 may be moved entirely to another node 112 and the instance 110 on the current node 112 may be terminated.

In one embodiment, the adaptation may be a duplication. For example, a single node 112 may not be available that has enough resources to accept a full migration of the instance 110. As a result, the instance 110 may be split into multiple instances 110 over multiple different nodes 112. In other words, the instance 110 may be duplicated over a plurality of different nodes 112.

In one embodiment, each agent 114 may manage resource availability of a respective node 112 with other nodes 112 and also the amount of resources that are used by each instance 110. The agent 114 may communicate with the instances 110 that run on the respective node 112.

In one embodiment, when the agent 114 receives a report about a potential bottleneck from an instance 110, the agent 114 first identifies the level of current input load of the instance 110. The levels of input load may be either predefined for each process 108 of the workflow 102 or calculated from the load of the input data 104.

For example, a workflow may have two processes, $p_1$ and $p_2$, and each process runs a single instance. For the load L from data source, $p_1$ generates output data $d_1$, and for the input data $d_1$, $p_2$ generates output data $d_2$. In one embodiment, $d_1$ and $d_2$ may be formulated by the function of their input data L and $d_1$, respectively. This formulation may be obtained by experience or estimation. The levels of input data load may be defined as a range in coarse-grained levels such as small ($L_{min}$~$L_1$), medium ($L_1$~$L_2$), and large ($L_2$~$L_{max}$), but also it may have more fine-grained levels. The more levels defined, the more agile resource adaptation is and the resource utilization of a node 112 may increase. However, it also adds the overhead of resource adaptation if the load changes frequently.

To predict bottlenecks in the workflow 102, an input rate and a process rate can be measured at a steady state and a network flow analysis may be applied to compute the overall flow rate of the workflow 102. In one embodiment, the input rate or data arrival rate ϕ may be defined as a data generation rate $D(L_i, t, p)$ at every $i^{th}$ level at time t for a process p of the workflow 102. The processing rate μ may be defined as a rate $R(L_i, t, p)$. The network flow analysis may include for example a Jackson networks analysis or a Baskett, Chandy, Muntz and Palacios (BCMP) network analysis. In one embodiment, a steady loading factor ρ and a multiplicative factor g to account for a number of processing cores available to a given process 108 may also be applied.

In one embodiment, the application of the network flow analysis may be used to compute the loading factors at different times and convert the loading factors to predict resource requirements. The predicted resource requirements may be compared to the currently available resources or using the flow balance equations discussed above to determine that a resource shortfall may occur, thus, resulting in a bottleneck at the process 108.

Once a bottleneck is detected and an adaptation is required a resource statement may be sent out to a predetermined number of hops to one or more neighboring nodes 112 of a cluster of nodes 112. In one embodiment, the number of neighboring nodes 112 that the resources statement is transmitted to is optimized to balance a likelihood of finding a node 112 having the required resources versus a ripple effect of propagating additional messages between the nodes 112. Thus, the present method performs ripple aware adaptation or minimizes the ripple effect when performing the adaptation.

In one embodiment, the resource statement (RS) may be represented as RS=<$R(L_i)$, <$N_{preceding}$, $N_{succeeding}$>>, wherein $R(L_i)$ is a resources requirement for a level i, $N_{preceding}$ is a node location of a preceding node and $N_{succeeding}$ is a node location of a succeeding node. In one embodiment, the resource requirement $R(L_i)$ may be represented as $R(L_i)$=<$NW_{in}$, $P_{inst}$, $NW_{out}$>, wherein $NW_{in}$ represents an inbound network bandwidth, $NW_{out}$ represents an outbound network bandwidth and $P_{inst}$ represents a processing capability needed for the instance 110.

In one embodiment, the number of hops the RS is sent may be predetermined based on the required amount of resources. For example, data may be collected on previous adaptations to establish a threshold value that is based on a total delay and whether the total delay is acceptable in maintaining a level of quality of service (QoS). For example, the total delay may comprise a sum of a round trip delay, an evaluation delay and an adaptation delay. For example, the round trip delay may include an amount of time needed for the RS to be sent and a response to be received. The evaluation delay may include an amount of time to evaluate responses from the neighboring nodes 112 to select the best matching neighboring node or nodes with the required resources in the RS. The adaptation delay may include an amount of time needed to implement the adaptation (e.g., the migration or the duplication).

In one embodiment, the difference in a desired load level and the current load level may be compared to the threshold value to determine a number of hops. For example, as discussed above, the load levels may be defined as a coarse level of loads. Thus, if the difference in load level is less than a low load level, only 1 hop may be needed. If the difference in load level is less than a medium load level, 2 hops may be needed. If the difference in load level is less than a high load level, then 3 hops may be needed, and so forth.

In one embodiment, each hop may be defined as a different level of neighboring nodes 112 in a cluster of nodes. For example, FIG. 1 illustrates a first hop 120 that includes nodes $112_1$ to $112_3$, a second hop 122 that also includes nodes $112_4$ and $112_5$ and a third hop 124 that also includes nodes $112_6$-$112_n$. It should be noted that the number of nodes 112 in each hop and the number of hop levels is only provided as an example and may include any number of nodes 112 and number of hop levels.

In one embodiment, after the number of hops is determined and the RS is transmitted to the neighboring nodes 112, each neighboring node 112 that receives the RS performs an evaluation for an instance $l_k$ that reported the bottleneck to see if the neighboring node $N_j$ satisfies the following three statements 1) $N_j \cdot NW_{in}(l_{k-1}) \geq NW_{in}$, 2) $N_j \cdot NW_{out}(l_{k+1}) \geq NW_{out}$, and 3) $N_j \cdot P_{node} \geq P_{inst}$, wherein $P_{node}$ is i the processing resources of the node. In one embodiment, if no single node is available, duplication may be applied by combining multiple nodes. Then a minimum number of nodes 112 are selected that satisfy the above three statements over a sum of nodes from 1 to m nodes 112.

If the above three statements are satisfied, but they are less than those for next level, $L_{i+1}$, the neighbor agent responds with level $L_i$. If the level for its available resources is higher or lower than $L_i$, then it responds with $L_j$, the highest level the node can provide.

After each neighboring node 112 performs the evaluation, the neighboring nodes 112 send a response back to the agent 114 indicating whether the required resources are available. In one embodiment, the agent 114 may wait for a predetermined time period before deciding whether adaptation is possible and whether a migration or duplication will be performed.

In one embodiment, a decision to choose between migration or duplication may be made in the priority of, 1) a node 112 which has the exact level $L_i$ the agent requested (migration), 2) a node 112 which has higher level than $L_i$ in the increasing order (migration) or 3) multiple nodes 112 which have lower level than $L_i$ in the decreasing order (duplication).

Referring to FIG. 1 as an example, the instance $110_6$ may predict that the process $108_4$ may be bottleneck, as described above. The instance $110_6$ may be assigned to run on the node $112_1$. The instance $110_6$ may report the predicted bottleneck to the agent $114_1$. The agent $114_1$ may determine that the difference in the desired load level and the current load level is at a low load level. Based on the difference being a low load level, the agent $114_1$ may determine the RS only needs to be transmitted over one hop 120 of the cluster of nodes 112.

In one embodiment, the $114_1$ prepares the RS that includes the resource requirement and sends the RS to the agent $114_2$ of the node $112_2$ and the agent $114_3$ of the node $112_3$ within the first hop 120. The agent $114_1$ waits for a predetermined amount of time and receives responses from the agents $114_2$ and $114_3$.

In one embodiment, the agent $114_2$ may send a response indicating that the node $112_2$ has enough resources to satisfy all of the required resources needed by the instance $110_6$. As a result, the instance $110_6$ may be migrated to the node $112_2$ and the instance $110_6$ may be terminated on the node $112_1$.

In another embodiment, the neither agent $114_2$ of the node $112_2$ or the agent $114_3$ of the node $112_3$ may send a response indicating that either has enough resources to meet the requirements for the instance $110_6$. However, the amount of resources available on the nodes $112_2$ and $112_3$ in combination with the resources available on the node $112_1$ may be enough to meet the resource requirements of the instance $110_6$. As a result, a duplication may be performed and the instance $110_6$ may be divided across each of the nodes $112_1$-$112_3$. In other words, the instance $110_6$ may continue to run on the node $112_1$ and the nodes $112_2$ and $112_3$ may each initiate a new instance that is a portion of the instance $110_6$.

In one embodiment, an admission control may be used to ensure that the adaptation is implemented smoothly as the RS and responses are exchanged between nodes 112. For example, after the agent 114 that sends the RS receives response from the agents 114 of neighboring nodes 112, the agent may send a notification to the neighboring nodes 112 that are selected for either migration or duplication to confirm that the resources are still available. This is to prevent an agent 114 of a neighboring node 112 from allocating the available resources to another node 112 during a time period that the response is sent to the requesting agent 114 and the adaptation is initiated by the requesting agent 114.

In one embodiment, the method may also perform a serialized adaptation if two consecutive processes 108 are predicted to be bottlenecks. For example, in FIG. 1, the process $108_4$ is identified as a bottleneck. If the next process $108_5$ was also predicted to be a bottleneck, the serialized adaptation may be implemented to prevent two respective agents 114 of two respective nodes 112 from initiating an adaptation simultaneously.

For example, when the adaptation for the process $108_4$ is initiated by the agent $114_1$, the agent $114_1$ may send a block resource adaptation message or signal to an agent 114 on a node 112 of the process $108_5$. As a result, the adaptation for the process $108_5$ will not begin until the adaptation for the process $108_4$ is completed.

As a result, the embodiments of the present disclosure provide a ripple rate sensitive adaptation in response to estimated bottlenecks in a workflow of real-time streaming data. The adaptation may be carefully managed by monitoring system parameters, messaging delays and changes in the data streams. The present disclosure provides a predictive adaptation that is based on calculated resource requirements that can utilize available resources from existing nodes in advance rather than reactive adaptations that blindly add more nodes to a cluster to meet the need for additional resources after detecting bottlenecks.

Figure 2:
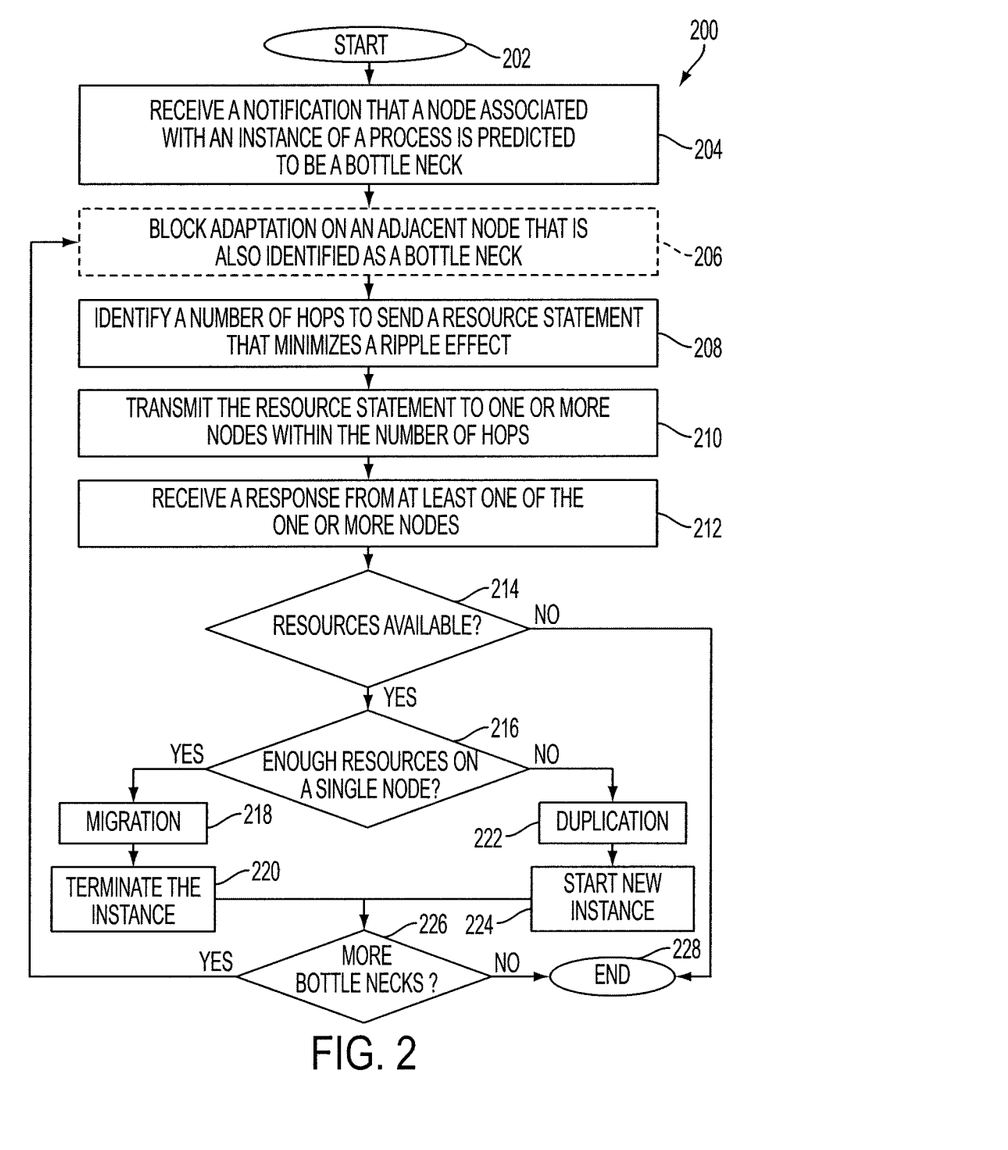
FIG. 2 illustrates an example flowchart of one embodiment of a method for adapting resources of the cluster of nodes for a real-time streaming workflow.

FIG. 2 illustrates a flowchart of a method 200 for adapting resources of the cluster of nodes for a real-time streaming workflow. In one embodiment, one or more steps or operations of the method 200 may be performed by the agent 114 running on the node 112 or a general-purpose computer as illustrated in FIG. 3 and discussed below.

At step 202 the method 200 begins. At step 204, the method 200 receives a notification that a node associated with an instance of a process of the workflow is predicted to be a bottleneck. As discussed above, an instance of the process of the workflow may monitor an incoming data rate, an outgoing data rate and a processing rate of the instance. For example, if the processing rate is smaller than the incoming date rate a bottleneck may occur because the input data is not being processed in time due to a lack of processing capability at the node or if the output data rate is smaller than the processing rate a bottleneck may occur because the generated output is not being delivered in time due to a lack of network bandwidth between the instance and its succeeding instance.

At optional step 206, the method 200 blocks adaptation on an adjacent node that is also identified as a bottleneck. For example, as discussed above, if two consecutive processes are predicted to be bottlenecks, a serialized adaptation may be implemented. In other words, an agent of a node may send a block adaptation notification or signal to the adjacent node that is also predicted to be a bottleneck to prevent the adjacent node from initiating an adaptation until the current node has completed its adaptation.

At step 208, the method 200 identifies a number of hops to send a resource statement that minimizes a ripple effect. For example, a difference based on a desired load and a current load of the node may be calculated and compared to a threshold value to determine the number of hops. The threshold value is based on data collected on previous adaptations to ensure a number of hops are selected that minimizes the ripple effect from generation and transmission of resource statements such that the QoS can be maintained.

At step 210, the method 200 transmits the resource statement to one or more nodes within the number of hops. Once the number of hops is selected, the agent of the node may transmit the resource statement to one or more nodes within the number of hops. In one embodiment, the resource statement includes a resource requirement for the instance and a location of a preceding node and a succeeding node.

At step 212, the method 200 receives a response from at least one of the one or more nodes. In one embodiment, the node that transmitted the resource statement may wait a predetermined amount of time. For example, once the predetermined amount of time (e.g., 30 seconds) has expired the node may proceed to analyze the collected responses. Each one of the responses may include an available amount of resources at each neighboring node within the number of hops that was selected at step 210.

At step 214, the method 200 determines if resources are available based on the responses that are received. If no resources are available on any of the neighboring nodes within the cluster of nodes, then the adaptation cannot be performed and the method proceeds to step 228.

However, if resources are available at one or more of the neighboring nodes within the cluster of nodes, the method 200 may proceed to step 216. At step 216, the method 200 determines if enough resources are available on a single node. If there are enough available resources on a single node to meet the resource requirements in the resource statement, then the method 200 may proceed to step 218.

At step 218, the method 200 performs a migration adaptation. In other words, the entire instance is migrated to another node.

At step 220, the method 200 terminates the instance on the node that was previously processing the instance. The method may then proceed to step 226.

Referring back to step 216, if enough available resources are not available on a single node, the method 200 may proceed to step 222. At step 222, the method 200 performs a duplication adaptation.

At step 224, the method 200 may start a new instance. For example, the instance may be split up into multiple instances onto multiple different nodes. Thus, the node that was initially assigned to the process the instance may be maintained and new instances may be created and processed on different additional nodes. The method 200 may then proceed to step 226.

At step 226, the method 200 determines if there are more bottlenecks that were predicted. If there are more bottlenecks, the method 200 may return to optional step 206 and repeat steps 206-226 until there are no more bottlenecks that require adaptation. At step 214, the method 200 ends.

As a result, the embodiments of the present disclosure transform the methods for resource management into an inventive application for managing workflow of real-time streaming data using a ripple sensitive adaptation based on predictions of bottlenecks in advance. The methods significantly improve the technological field of distributed processing via a cluster of hardware nodes and the management of resources on the cluster of nodes for real-time streaming workflows. Furthermore, the embodiments of the present disclosure improve the functioning of a computer or processor deployed as a node by allowing the computer to implement an adaptation with resources from neighboring nodes. The function of the computer or hardware deployed as a node is further improved in that the computer balances a likelihood of finding the necessary resources to a ripple effect of requiring the neighboring nodes to process the additionally generated messages in determining how many neighboring nodes should receive the message.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

Figure 3:
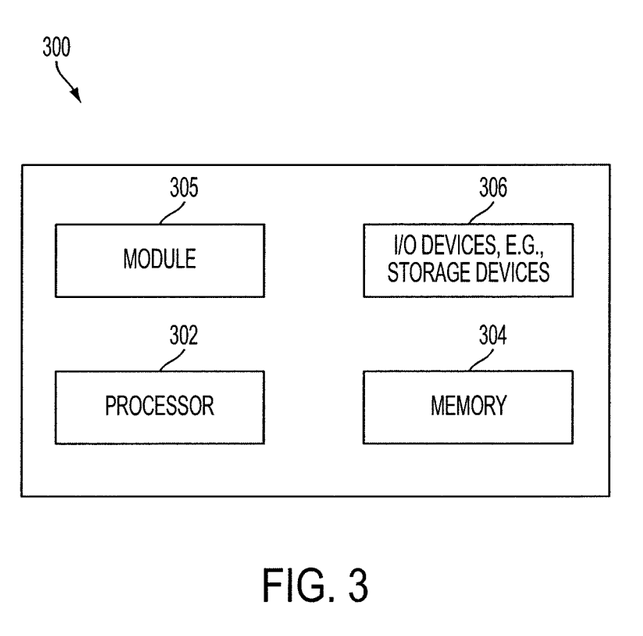
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for adapting resources of the cluster of nodes for a real-time streaming workflow, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for adapting resources of the cluster of nodes for a real-time streaming workflow (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for adapting resources of the cluster of nodes for a real-time streaming workflow (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for adapting resources of the cluster of nodes for a real-time streaming workflow, comprising:

receiving, by a processor, a notification that a node of the cluster of nodes associated with an instance of a process of the real-time streaming workflow is predicted to be a bottleneck;

identifying, by the processor, a number of hops to send a resource statement when the bottleneck is predicted that minimizes a ripple effect associated with transmitting the resource statement;

transmitting, by the processor, the resource statement to one or more nodes of the cluster of nodes within the number of hops;

receiving, by the processor, a response from at least one of the one or more nodes within the cluster of nodes, wherein the response from the at least one of the one or more nodes within the cluster of nodes is based on an evaluation performed by the at least one of the one or more nodes within the cluster of nodes, wherein the evaluation is a comparison of an inbound network bandwidth, an outbound network bandwidth and a processing capability of the at least one of the one or more nodes within the cluster of nodes to an inbound network bandwidth, an outbound network bandwidth and a processing capability of the node; and adapting, by the processor, a resource usage to the at least one of the one or more nodes within the cluster of nodes that the response was received from, wherein the adapting comprises a migration of the instance or a duplication of the instance.

2. The method of claim 1, wherein the resource usage comprises at least one of: a memory resource or a processor resource.

3. The method of claim 1, wherein the predicting is based on $D(L_i, t, p)$, wherein D is a data generation rate that is a function of an ith level $L_i$, at a time t of a process p and $R(L_i, t, p)$, wherein R is data processing rate of the ith level $L_i$, at the time t of the process p.

4. The method of claim 1, wherein the number of hops is identified based on a difference between a desired load level and a current load level and a threshold value.

5. The method of claim 4, wherein the threshold value is based on a total delay comprising a sum of a round trip delay, a time required for evaluation and a time to implement the adapting.

6. The method of claim 1, wherein the resource statement comprises a resource requirement and a location of a preceding node and a succeeding node.

7. The method of claim 6, wherein the resource requirement for an ith level, $L_i$, is a function of an inbound network bandwidth, a processing capability and an outbound network bandwidth of the preceding node and the succeeding node.

8. The method of claim 1, wherein the adapting is performed in serial when an adjacent node to the node is also predicted to be the bottleneck.

9. A non-transitory computer-readable medium storing a plurality of instructions which, when executed by a processor of an endpoint device, cause the processor to perform operations for adapting resources of the cluster of nodes for a real-time streaming workflow, the operations comprising:

receiving a notification that a node of the cluster of nodes associated with an instance of a process of the real-time streaming workflow is predicted to be a bottleneck;

predicting a bottleneck at the node based monitoring of the resource usage;

identifying a number of hops to send a resource statement when the bottleneck is predicted that minimizes a ripple effect associated with transmitting the resource statement;

transmitting the resource statement to one or more nodes of the cluster of nodes within the number of hops;

receiving a response from at least one of the one or more nodes within the cluster of nodes, wherein the response from the at least one of the one or more nodes within the cluster of nodes is based on an evaluation performed by the at least one of the one or more nodes within the cluster of nodes, wherein the evaluation is a comparison of an inbound network bandwidth, an outbound network bandwidth and a processing capability of the at least one of the one or more nodes within the cluster of nodes to an inbound network bandwidth, an outbound network bandwidth and a processing capability of the node; and adapting a resource usage to the one of the at least one or more nodes within the cluster of nodes that the response was received from, wherein the adapting comprises a migration of the instance or a duplication of the instance.

10. The non-transitory computer-readable medium of claim 9, wherein the resource usage comprises at least one of: a memory resource or a processor resource.

11. The non-transitory computer-readable medium of claim 9, wherein the number of hops is identified based on a difference between a desired load level and a current load level and a threshold value.

12. The non-transitory computer-readable medium of claim 11, wherein the threshold value is based on a total delay comprising a sum of a round trip delay, a time required for evaluation and a time to implement the adapting.

13. The non-transitory computer-readable medium of claim 9, wherein the resource statement comprises a resource requirement and a location of a preceding node and a succeeding node.

14. The non-transitory computer-readable medium of claim 13, wherein the resource requirement for an ith level, $L_i$, is a function of an inbound network bandwidth, a processing capability and an outbound network bandwidth of the preceding node and the succeeding node.

15. The non-transitory computer-readable medium of claim 9, wherein the adapting is performed in serial when an adjacent node to the node is also predicted to be the bottleneck.

* * * * *